US012646253B2

(12) United States Patent
Wen

(10) Patent No.: US 12,646,253 B2
(45) Date of Patent: Jun. 2, 2026

(54) NEURAL SEMANTIC 3D CAPTURE WITH NEURAL RADIANCE FIELDS

(71) Applicant: Electronic Arts Inc., Redwood City, CA (US)

(72) Inventor: Yangming Wen, Fremont, CA (US)

(73) Assignee: Electronic Arts Inc., Redwood City, CA (US)

( * ) Notice: Subject to any disclaimer, the term of this patent is extended or adjusted under 35 U.S.C. 154(b) by 134 days.

(21) Appl. No.: 18/619,163

(22) Filed: Mar. 28, 2024

(65) Prior Publication Data

US 2025/0308152 A1    Oct. 2, 2025

(51) Int. Cl.
| | |
|---|---|
| *G06T 17/00* | (2006.01) |
| *G06V 10/82* | (2022.01) |
| *G06V 20/70* | (2022.01) |

(52) U.S. Cl.
CPC .............. *G06T 17/00* (2013.01); *G06V 10/82* (2022.01); *G06V 20/70* (2022.01); *G06T 2207/20081* (2013.01); *G06T 2207/20084* (2013.01)

(58) Field of Classification Search
CPC ..................... G06T 17/00; G06T 17/20; G06T 2207/20081; G06T 2207/20084; G06V 10/82; G06V 20/70
See application file for complete search history.

(56) References Cited

U.S. PATENT DOCUMENTS

| | | | | |
|---|---|---|---|---|
| 12,430,934 | B2 * | 9/2025 | Sarkar | ................ G06V 10/7715 |
| 2023/0023126 | A1 * | 1/2023 | Ansari | ...................... G06T 7/55 |
| 2024/0104831 | A1 * | 3/2024 | Lin | ...................... G06V 10/762 |

OTHER PUBLICATIONS

Metzer et al. "Latent-NeRF for Shape-Guided Generation of 3D Shapes and Textures," Proceedings of the IEEE/CVF Conference on Computer Vision and Pattern Recognition (CVPR), pp. 12663-12673 (available at: https://arxiv.org/abs/2211.07600) (Jun. 17-24, 2023).
Mildenhall et al. "NeRF: Representing Scenes as Neural Radiance Fields for View Synthesis," Communications of the ACM, vol. 65, Iss. 1, pp. 99-106 (available at: https://arxiv.org/abs/2003.08934) (Dec. 17, 2021).
Kirillov et al. "Segment Anything," Meta AI Research, FAIR (available at: https://arxiv.org/abs/2304.02643) (Apr. 5, 2023).

(Continued)

*Primary Examiner* — George Eng
(74) *Attorney, Agent, or Firm* — Leydig, Voit & Mayer, Ltd.

(57) ABSTRACT

A method of generating a three-dimensional (3D) model includes obtaining a set of two-dimensional (2D) images of a scene acquired by one or more cameras from a plurality of camera angles at a plurality of camera positions. Each 2D image corresponds to a respective camera angle and a respective camera position. The method further includes obtaining the respective camera angle and the respective camera position for each 2D image, and generating one or more semantic masks from the set of 2D images. Each semantic mask corresponds to a class of one or more objects in the scene. The method further includes training a neural radiance field (NeRF) model, using the set of 2D images and the one or more semantic masks as a training dataset, to obtain a trained NeRF model. The trained NeRF model is an implicit 3D model of the one or more objects in the scene.

20 Claims, 15 Drawing Sheets

(56) References Cited

OTHER PUBLICATIONS

Zhang et al. "Dive into Deep Learning" (available at: https://d2l.ai/d2l-en.pdf) (Feb. 10, 2023).

Wang et al. "NeuS: Learning Neural Implicit Surfaces by Volume Rendering for Multi-view Reconstruction," 35th Conference on Neural Information Processing Systems (NeurIPS 2021), Version 3 (available at: https://arxiv.org/abs/2106.10689) (Feb. 1, 2023).

* cited by examiner $$(x, y, z, \theta, \phi) \longrightarrow \boxed{|\ ||\ ||\ |} \longrightarrow (r, g, b, \sigma)$$

$$F_{\Theta}$$

*FIG. 2*

$(x, y, z, \theta, \phi)$

310

320

$\sigma$

Ray 310

Ray Distance $\sigma$

Ray 320

Ray Distance

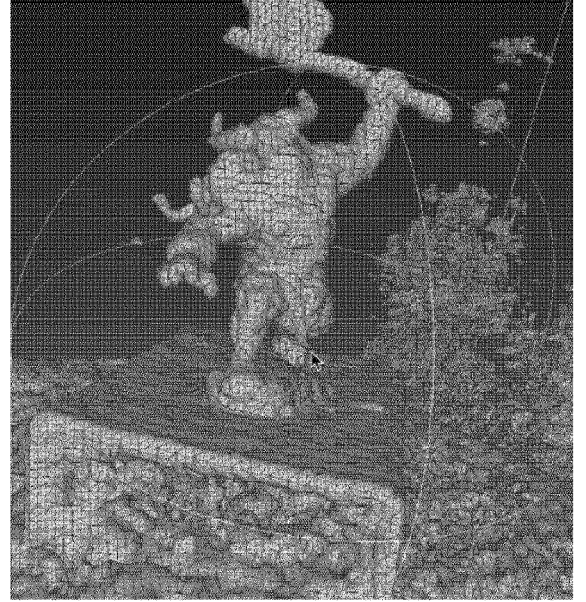
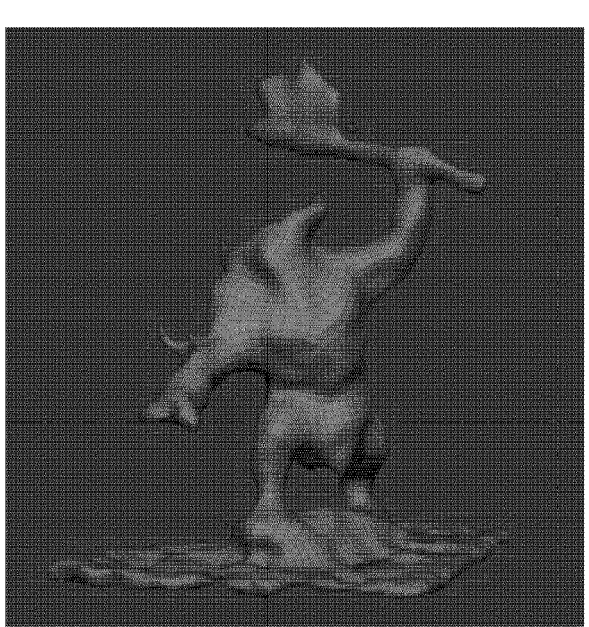
FIG. 5A
FIG. 5B 610     620     630

700

1500

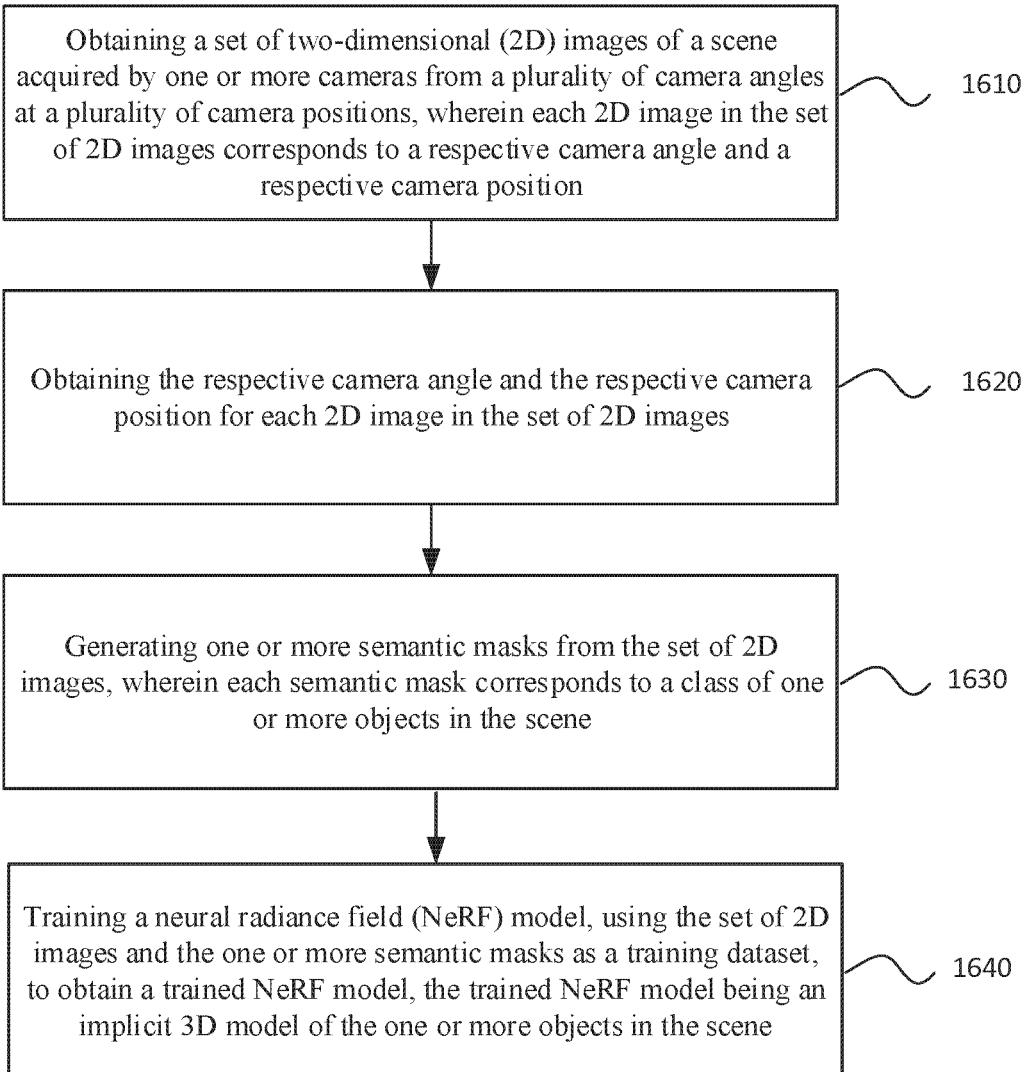

Obtaining a set of two-dimensional (2D) images of a scene acquired by one or more cameras from a plurality of camera angles at a plurality of camera positions, wherein each 2D image in the set of 2D images corresponds to a respective camera angle and a respective camera position          1610

Obtaining the respective camera angle and the respective camera position for each 2D image in the set of 2D images          1620

Generating one or more semantic masks from the set of 2D images, wherein each semantic mask corresponds to a class of one or more objects in the scene          1630

Training a neural radiance field (NeRF) model, using the set of 2D images and the one or more semantic masks as a training dataset, to obtain a trained NeRF model, the trained NeRF model being an implicit 3D model of the one or more objects in the scene          1640

FIG. 16

NEURAL SEMANTIC 3D CAPTURE WITH NEURAL RADIANCE FIELDS

FIELD

This disclosure generally relates to computer graphics and, more particularly, to systems and methods related to generating three-dimensional (3D) models from two-dimensional (2D) images.

BACKGROUND

There is an important demand for 3D content for computer graphics. 3D modeling is the process of creating a digital model of an object or a surface within a 3D space. 3D models can serve a multitude of purposes. For example, in the entertainment industry, 3D models can bring life to characters and environments in films and video games. Industrial designers can use 3D models to visualize and prototype products. In the medical field, 3D models can be used for detailed visualization of anatomies, aiding research and education.

3D models can be represented by explicit functions. For example, 3D models can be represented by voxels, point clouds, or polygonal meshes. A voxel refers to a grid point in a 3D grid (e.g., with an x, y and z coordinate). A voxel is analogous a pixel in a 2D image. Each voxel contains a color value. A point cloud is a discrete set of data points in 3D space representing a surface of an object. A polygonal mesh is a collection of vertices, edges, and faces that defines the shape of a polyhedral object. The faces usually include triangles (i.e., a triangle mesh), quadrilaterals (quads), or other simple convex polygons (n-gons). Each of these forms of explicit representation of 3D models can have some limitations or disadvantages. For example, voxel representation of 3D models can occupy a very large memory. Point cloud representation of 3D models lack connectivity information. Polygonal meshes may not allow arbitrary topologies.

3D models can be created manually, algorithmically (procedural modeling), or by scanning. Manual methods are usually time-consuming and require a lot of effort from artists. One way of obtaining 3D models is by 3D reconstruction. 3D reconstruction involves converting a set of 2D images or videos into a 3D representation. It is the reverse process of obtaining 2D images from 3D scenes. A 2D image is a projection from a 3D scene onto a 2D plane. In this process, the depth information is lost. A 3D point corresponding to a specific image point is constrained to be on the line of sight. From a single image, it is not possible to determine which point on this line corresponds to the image point. If two images are available, then the position of a 3D point can be found as the intersection of the two projection rays. This process is referred to as triangulation. 3D reconstruction often involves techniques like photogrammetry, in which multiple photographs are taken of an object or a scene from different viewpoints in order to create a 3D model of the object or the scene. Some existing systems for constructing 3D models involve complicated hardware (e.g., stereo rigs) and software, resulting in a high cost. In addition, traditional photogrammetry pipelines tend to generate noisy meshes, necessitating manual clean-up by artists, which can be a laborious process. Therefore, there is a need for improved photogrammetry pipeline that can generate high quality meshes automatically without manual postprocessing.

SUMMARY

Embodiments of the disclosure provide a method, computer-readable storage medium, and device for generating 3D models from 2D images. The method includes obtaining a set of two-dimensional (2D) images of a scene acquired by one or more cameras from a plurality of camera angles at a plurality of camera positions. Each 2D image in the set of 2D images corresponds to a respective camera angle and a respective camera position. The method further includes obtaining the respective camera angle and the respective camera position for each 2D image in the set of 2D images, and generating one or more semantic masks from the set of 2D images. Each semantic mask corresponds to a class of one or more objects in the scene. The method further includes training a neural radiance field (NeRF) model, using the set of 2D images and the one or more semantic masks as a training dataset, to obtain a trained NeRF model. The trained NeRF model is an implicit 3D model of the one or more objects in the scene.

BRIEF DESCRIPTION OF THE DRAWINGS

FIGS. 2 and 3A-3B illustrate the concept of a neural radiance fields (NeRF) algorithm.

FIG. 5A shows an exemplary mesh created by a traditional NeRF pipeline; FIG. 5B shows the mesh after manual cleaning.

FIG. 16 is a flow diagram of method steps for generating 3D models of one or more objects in a scene according to some embodiments.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of this disclosure provide enhanced photogrammetry pipelines for generating 3D models by employing one or more semantic priors. Semantic masks can be generated from a set of 2D images of a scene, and are then embedded in the set of 2D images. The set of 2D images with the embedded semantic masks is used as a training dataset to train a neural radiance field (NeRF) model. An enhanced NeRF pipeline trained using the embedded semantic masks is able to generate high quality 3D meshes automatically, without the need for manual clean-up. It has been demonstrated that the enhanced NeRF pipeline can also generate high quality 3D models of fuzzy regions, such as human hair, for which traditional photogrammetry pipelines do not perform well.

3D reconstruction using artificial intelligence (AI) or machine learning (ML) is a fast developing field. In particular, neural radiance fields (NeRF) has emerged as a promising tool for 3D reconstruction. The NeRF algorithm can synthesize multiple views of a scene by optimizing an underlying continuous volumetric scene function using a sparse set of input 2D images. It represents a scene implicitly as a radiance field parametrized by a fully connected (non-convolutional) deep neural network (DNN). The network predicts a volume density and view-dependent emitted radiance given the spatial location (x, y, z) and viewing direction in Euler angles $(\theta, \phi)$ of a camera. By sampling many points along camera rays, a 2D image can be rendered using traditional volume rendering techniques. Postprocessing of the optimized NeRF model can convert the implicit 3D model into a mesh (or some other form of explicit representation).

According to embodiments of the present disclosure, scene-object decomposition is employed in a NeRF pipeline. Scene-object decomposition is also referred herein as segmentation. Visual perception priors are used to segment, search, and capture the content of a scene. Visual perception priors are also referred herein as semantic priors or semantic masks. A semantic mask includes a class label and, in some embodiments, voxels associated with the class label. That is, all voxels associated with the same class label are grouped together to create a semantic mask. Semantic masks are embedded in a set of 2D training images to help train the NeRF model. In some embodiments, alternatively or additionally, semantic masks can be used in the loss function for training the NeRF model. In some embodiments, a semantic segmentation model can be trained together with the NeRF model integrally.

Figure 1:
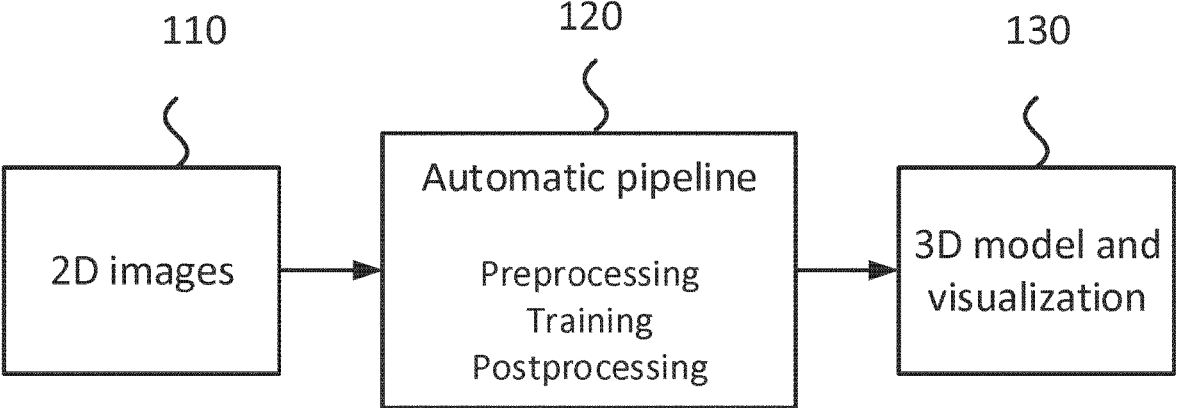
FIG. 1 illustrates an exemplary method of generating a 3D model of an object according to some embodiments.

FIG. 1 illustrates an exemplary method of generating a 3D model of an object according to some embodiments. At 110, a set of 2D images of a scene is provided. The scene may include one or more objects. The set of 2D images are acquired by one or more cameras from various viewpoints. The set of 2D images can also include frames of a video. At 120, the set of 2D images is input into an automatic pipeline. The automatic pipeline can include the steps of, e.g., preprocessing, training a NeRF model, and postprocessing. The set of 2D images are used as a training dataset for training the NeRF model. At 130, the automatic pipeline outputs a 3D model (e.g., a mesh) representing the one or more objects in the scene. The 2D images can be obtained from lightstage scan data, or from casual world captures (e.g., outdoor scenes captured by a mobile phone camera).

Figure 2:
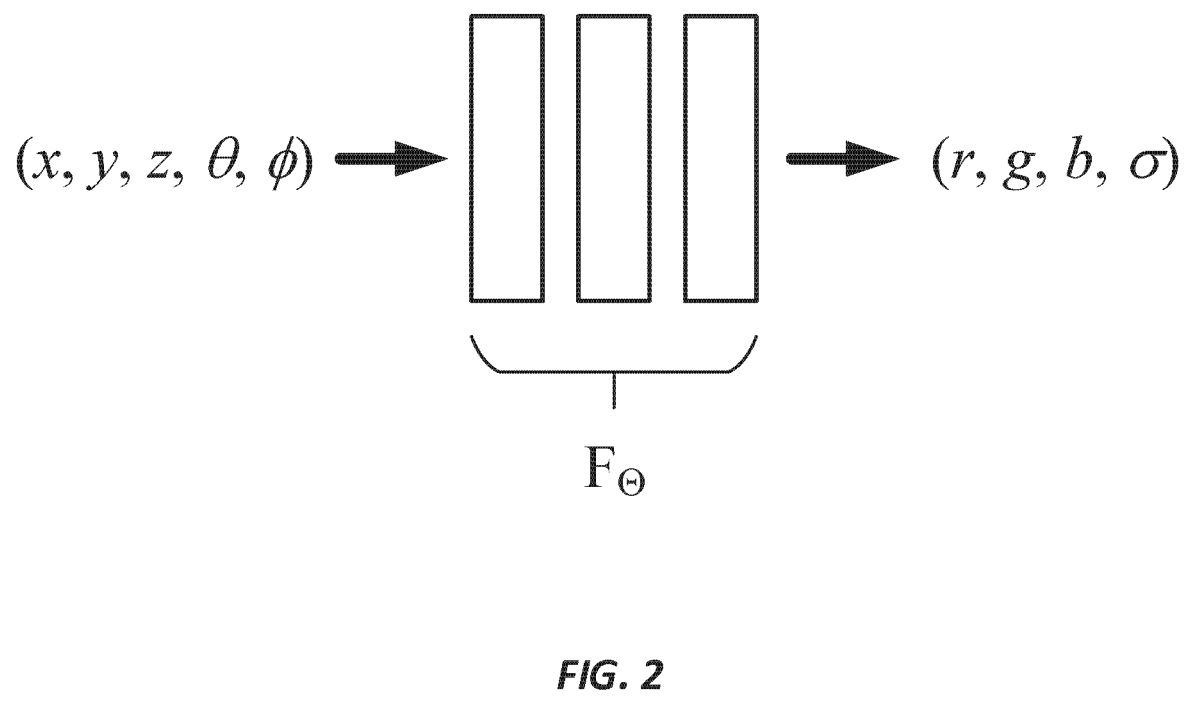
Figure 3A:
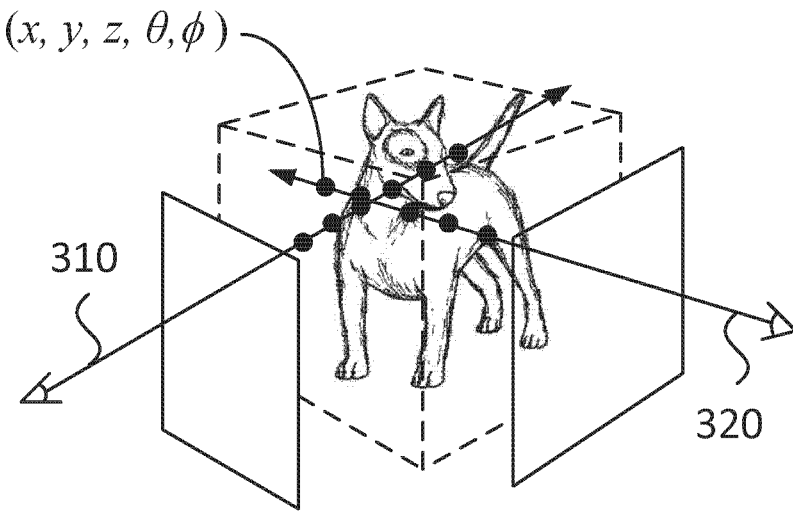
Figure 3B:
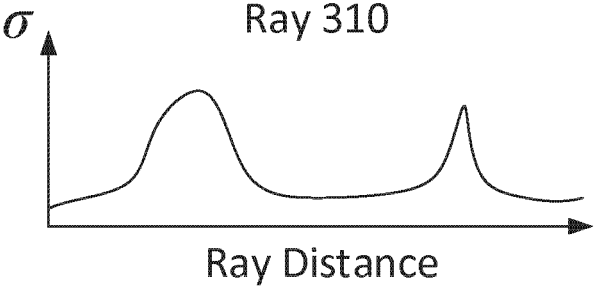
Figure 3B:
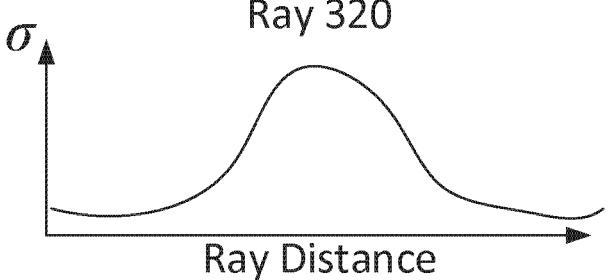

FIGS. 2 and 3A-3B illustrate the concept of a NeRF algorithm. A continuous scene is represented as a five-dimensional (5D) vector-value function $F_\Theta$. As illustrated in FIG. 2 and FIG. 3A, the input to the function $F_\Theta$ is a 3D location x=(x, y, z) and a 2D viewing direction d=$(\theta, \phi)$, where $\phi$ is the azimuthal angle (e.g., from zero to 360 degrees), and $\theta$ is the polar angle (e.g., from zero to 90 degrees). As illustrated in FIG. 2, the output of the function $F_\Theta$ is an emitted color c=(r, g, b) (e.g., for the three primary colors: red, green, and blue), and a volume density $\sigma$. The volume density indicates the opacity, controlling how much radiance is accumulated by a ray passing through the point (x, y, z). For example, if there is an opaque surface at that point, the density would have a high value (e.g., showing a peak in the plot of the density versus ray distance in FIG. 3B); if there is no object at that point, the density would have a low or zero value; and if there is a semi-transparent surface at that point, the density would have a medium value.

The function $F_\Theta$ is approximated by a fully-connected neural network without any convolutional layers (referred to as a multilayer perceptron or MLP, also referred to herein as a NeRF model). The weights $\Theta$ of the NeRF model are optimized using a set of 2D training images as ground truths. For example, as illustrated in FIG. 3A, for a first ray 310 from a first viewing direction, a number of points (represented by the solid dots) can be sampled along the first ray 310 (e.g., 128 points or 256 points). Similarly, for a second ray 320 from a second viewing direction, a number of points can be sampled along the second ray 320. The 3D location coordinate x=(x, y, z) and the 2D viewing direction coordinate d=$(\theta, \phi)$ would be input to the function $F_\Theta$. The output of the function $F_\Theta$ would be the color c=(r, g, b) and the density $\sigma$ for each of the sampled points. In FIG. 3B, the densities for each ray are plotted as a function of ray distance. In some embodiments, curve of densities for each ray can be colored to represent the color as a function of ray distance (from camera or view location). Using classical volume rendering techniques, the colors and the densities along each ray are accumulated to produce an estimated color value for that viewing angle in a 2D image. The estimated color value is compared to that of a ground truth (e.g., from one of the training images). The weights $\Theta$ of the NeRF model can be optimized by minimizing an error function (e.g., a mean square error function or an $L_2$ error function). The error function is also referred herein as a loss function. Once trained or optimized, the weights $\Theta$ of the function $F_\Theta$ implicitly represent a 3D model of the scene, and can be used to render 2D images of the scene from any arbitrary viewing angles.

Figure 4:
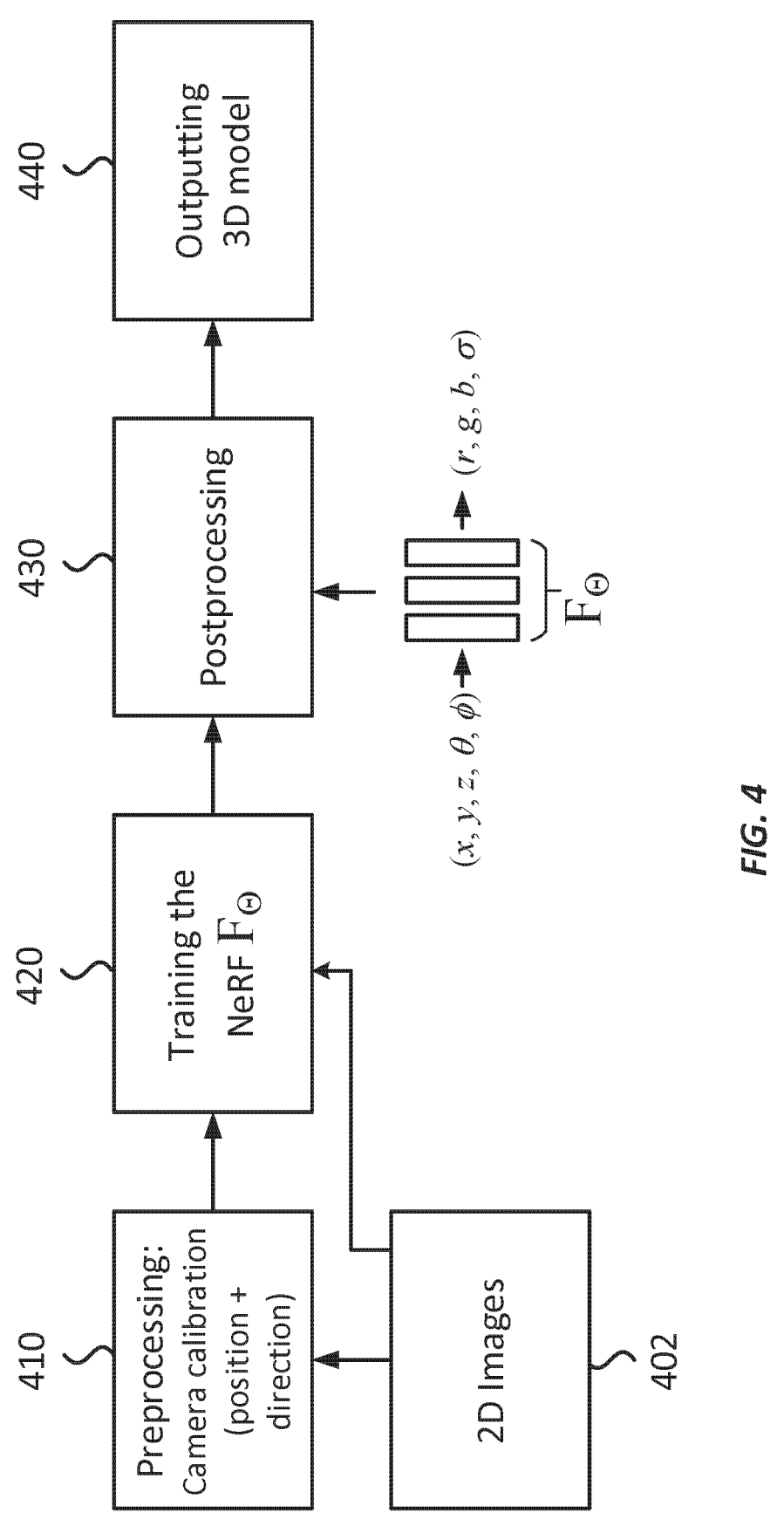
FIG. 4 illustrates an exemplary pipeline of creating a 3D model of an object using NeRF.

FIG. 4 illustrates an exemplary pipeline of creating a 3D model of an object using NeRF. At 402, a set of training images 402 are obtained. At 410, the set of training images 402 are preprocessed. The set of training images 402 includes overlapping sparse 2D images of an object (or objects), taken from different viewpoints (by one or more cameras, including video cameras). The output of the preprocessing are intrinsic and extrinsic camera parameters, including the positions and directions of the cameras, of all of the training images 402. The output of the preprocessing is referred herein as camera calibration data. The preprocessing can be performed, for example, using the COLMAP algorithm. At 420, the set of training images 402 and the camera calibration data are used to train the NeRF model. Rays from those camera positions and directions are queried during the training, as described above with respect to FIGS. 3A and 3B. At 430, the trained NeRF model is postprocessed to obtain a 3D model of the object. For example, the densities of a 3D grid of voxels can be determined from the trained NeRF model. A 3D mesh representing the object can be obtained by applying the Marching Cubes algorithm to the 3D grid of voxels. At 440, the 3D mesh representing the object is output. The 3D mesh can be used for rendering 2D images of the object from any viewing angles (e.g., for creating 2D video games or animation films). The 3D mesh can be created in various formats, such as the Polygon File Format (PLY), the OpenVDB format (e.g., in Houdini), and the like.

Some improvements to the initial NeRF method have been developed. For example, it has been recognized that NeRF can potentially encounter degenerate solutions. That is, a set of training images can be fitted for an arbitrary incorrect geometry by a suitable choice of outgoing 2D radiance at each surface point. Such phenomena are referred to as shape-radiance ambiguity. It has been shown that by structuring the MLP in the NeRF such that the scene position x and the viewing direction d are treated asymmetrically (e.g., by injecting d into the network close to the end of the MLP), such ambiguities can be avoided. It has also been shown that adding surface-aware constraints (e.g., by representing a surface as the zero-level set of a signed distance function or SDFs) can lead to more accurate surface reconstruction using NeRF.

It has also been recognized that, for unbounded scenes (e.g., outdoor scenes including nearby objects as well as the surrounding environment, such as buildings, mountains and clouds), NeRF can have severe resolution issues because it needs sufficient resolution in both foreground and background areas. To address this problem, a so-called inverted sphere parametrization scheme has been used to model the foreground and the background separately. The scene space is partitioned into two volumes, an inner unit sphere and an outer volume represented by an inverted sphere covering the complement of the inner volume. The inner volume contains the foreground, while the outer volume contains the remainder of the environment. The two volumes are modelled with two separate NeRFs. No re-parameterization is needed for the inner NeRF, as that part of the scene is bounded. For the outer NeRF, an inverted sphere parametrization is applied.

Even with these improvements, traditional NeRF pipelines often generate rather noisy meshes, necessitating manual clean-up by artists, which can be a laborious process. For example, FIG. 5A shows an exemplary mesh created by a traditional NeRF pipeline. As illustrated, the mesh is rather noisy. FIG. 5B shows the mesh after manual cleaning. Embodiments of the present disclosure provide enhanced NeRF pipelines for modeling and extracting 3D objects by adding semantic priors. Cleaner meshes can be generated automatically using the enhanced NeRF pipelines, without the need for manual clean-up.

According to some embodiments, as a step further than foreground-background decomposition, scene-object decomposition is employed in a NeRF pipeline. Visual perception priors are used to segment, search, and capture the content of a scene. Visual perception priors are also referred herein as semantic priors or semantic masks. A semantic mask includes a class label and voxels associated with it. That is, all voxels associated with the same class are grouped together to create a semantic mask. Semantic masks can be embedded in a set of 2D images, which is then used to train a NeRF model. The semantic masks can guide the optimization of the NeRF model by forcing the NeRF model to fit to the semantic masks. In doing so, a clean mesh of the object(s) of interest can be obtained automatically. Even if the semantic masks are imperfect, good results can still be obtained.

Figure 6A:
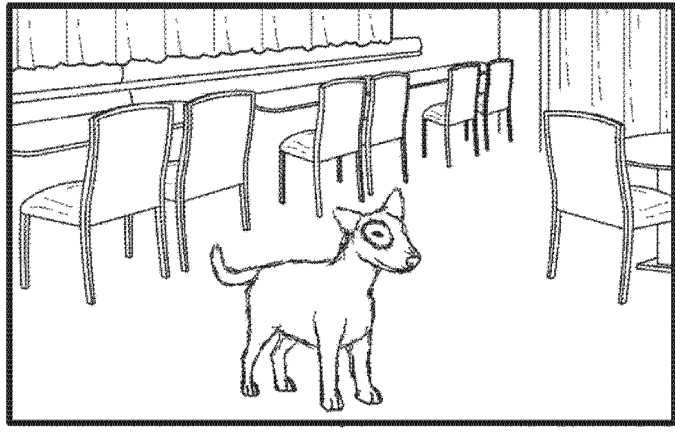
FIGS. 6A and 6B illustrate an example of scene-object decomposition according to some embodiments.
Figure 6B:
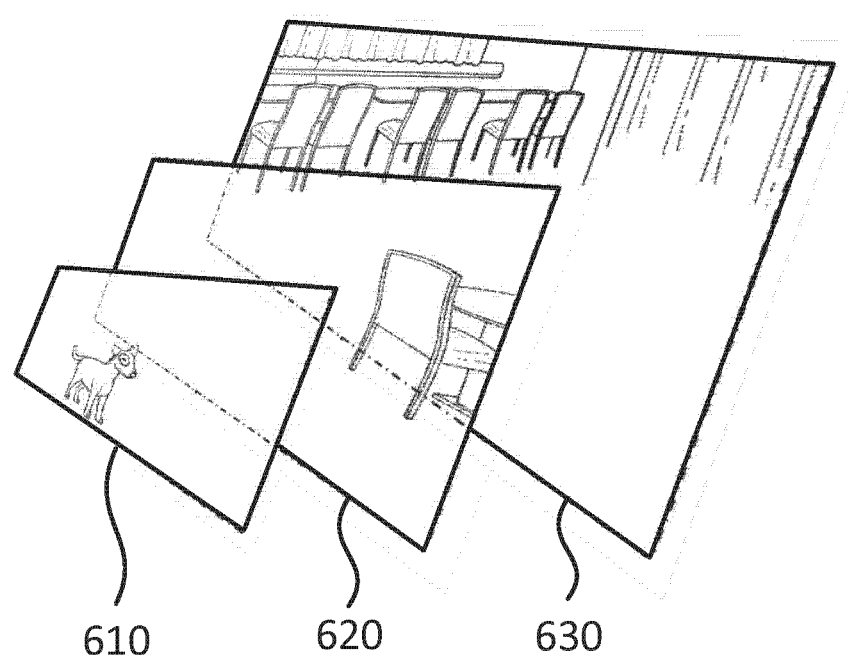

FIGS. 6A and 6B illustrate an example of scene-object decomposition according to some embodiments. FIG. 6A shows a 2D image of a scene. The scene includes a dog in the foreground, and some features of a room in the background. In FIG. 6B, the scene is decomposed into three classes or mask layers. The first mask layer 610 includes the dog. The second mask layer 620 includes some of the features of the room that are closer to the camera, e.g., a chair and table to the right side of the image. The third mask layer 630 includes the remaining features of the room. The first mask layer 610 would include the voxels associated with the dog. The second mask layer 620 would include the voxels associated with some of the features of the room that are closer to the camera, e.g., the chair and table to the right side of the image. The third mask layer 630 would include the voxels associated with the remaining features of the room.

Figure 7A:
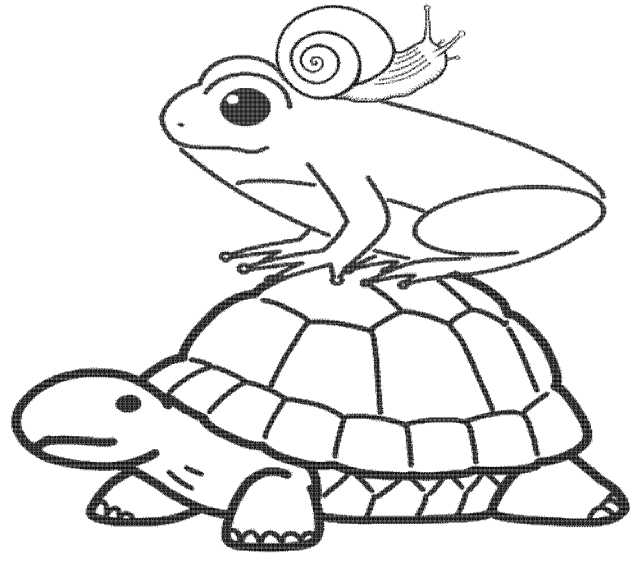
FIGS. 7A-7B, 8, 9 illustrate some exemplary semantic masks according to some embodiments.
Figure 7B:
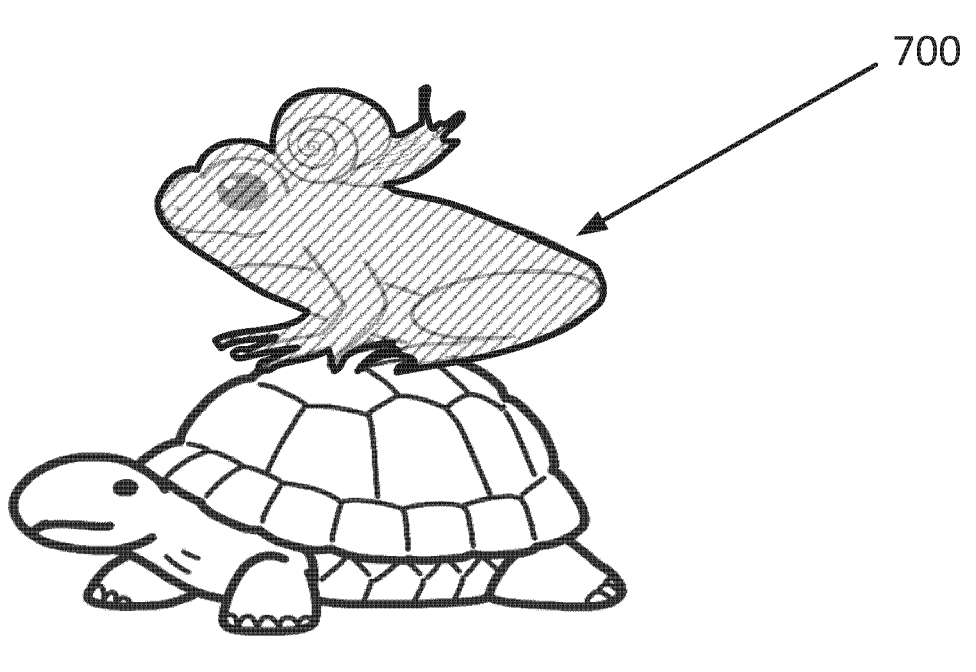

Semantic masks can be extracted from a set of 2D images using segmentation algorithms. For example, a machine-learning segmentation model (e.g., a convolutional neural network or CNN) can be used. The output of a segmentation algorithm can be a colorized feature map of a 3D scene, with each color representing a respective class label. FIGS. 7A-7B, 8A-8B, and 9A-9D illustrate some example semantic masks according to some embodiments. FIG. 7A shows an image of a frog sitting on the back of a turtle. There is also a snail sitting on the frog. FIG. 7B shows a semantic mask 700 representing the frog and the snail. In some embodiments, the semantic mask 700 may have a colored or patterned overlay to help visualize the outline of the semantic mask 700. The voxels associated with the frog and the snail are assigned to the semantic mask 700, e.g., represented by a color overlay. In some embodiments, the frog and the snail can be assigned to two different semantic masks, depending on the objects of interest.

Figure 8:
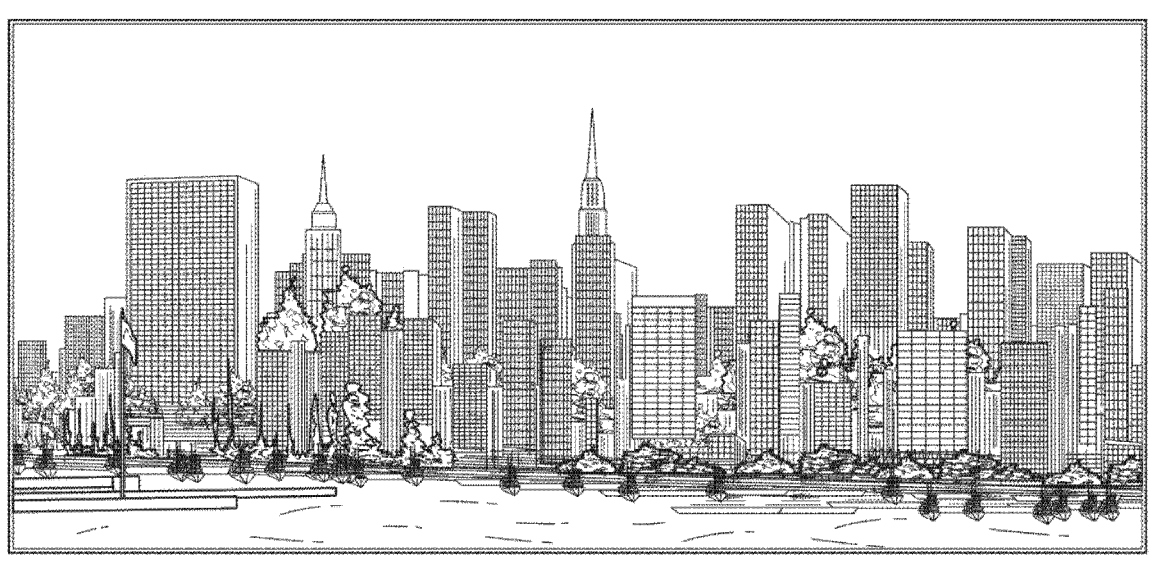
Figure 9:
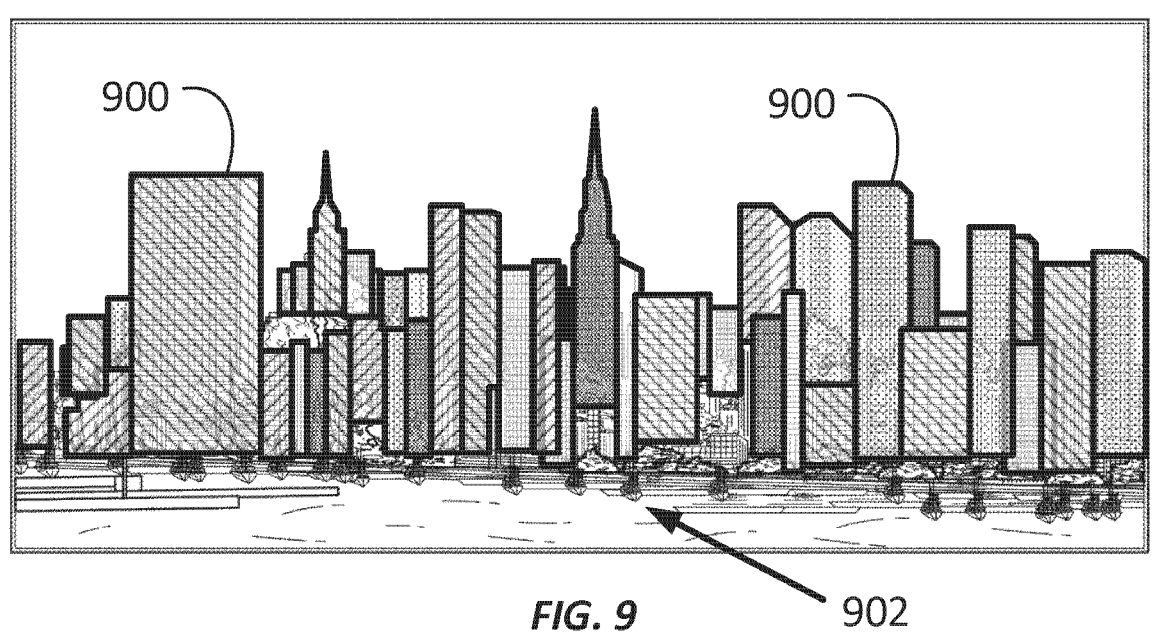

FIG. 8 shows an image of a city scape. The scene includes various buildings. FIG. 9 shows various semantic masks, for example, with various colored or patterned overlays, representing the various buildings. In this example, each building is represented by a respective semantic mask 900. In this example, each building is labeled with its own class. Alternatively, depending on the objects of interest, all buildings can be assigned to one class, and foreground objects, such a trees 902, can be assigned to a separate class.

Figure 10:
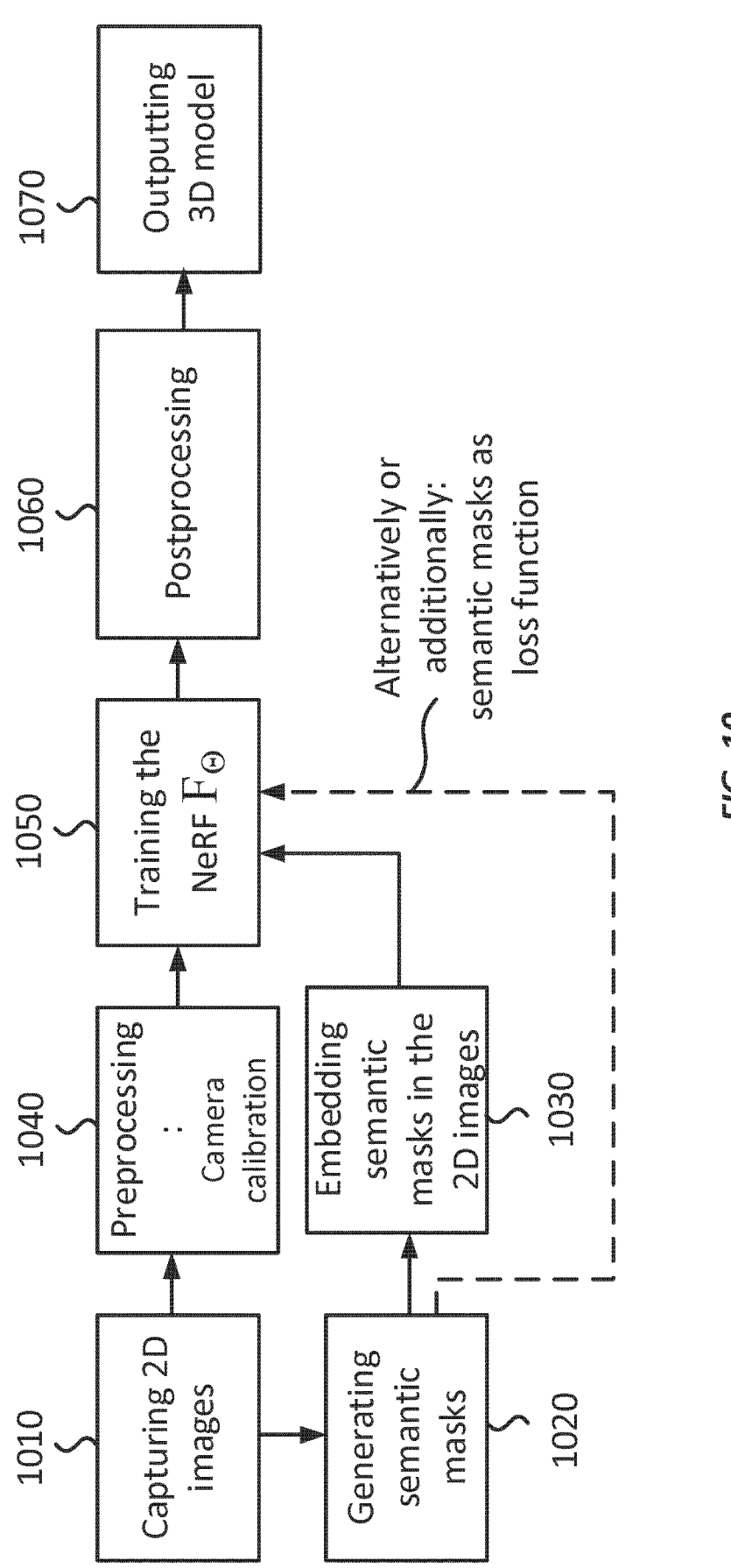
FIG. 10 illustrates an exemplary pipeline for generating a 3D model from a set of 2D images with embedded semantic masks, according to some embodiments.

In some embodiments, semantic masks are embedded in the set of 2D training images to help train the NeRF model. FIG. 10 illustrates an exemplary pipeline for generating a 3D model from a set of 2D images with embedded semantic masks, according to some embodiments. At 1010, a set of 2D images of a scene are captured. At 1020, semantic masks are generated from the set of 2D images. At 1030, the semantic masks are embedded in the set of 2D images. For example, the pixels of each 2D image can be labeled with the semantic masks. At 1040, the set of 2D images are preprocessed to obtain intrinsic and extrinsic camera parameters, including the positions and directions of the cameras for all of the 2D images. At 1050, the set of 2D images with embedded semantic masks, as well as the intrinsic and extrinsic camera parameters, are used as a training dataset to train the NeRF model. After the training is completed, the weights $\Theta$ of the NeRF model $F_\Theta$ implicitly represent a 3D model of the scene. At 1060, postprocessing can be performed to convert the implicit 3D model into a mesh (or some other form of explicit representation). At 1070, the 3D model (e.g., a mesh) is output. According to some embodiments, the semantic masks are applied in the final stage of the training of the NeRF model, so as to force the NeRF model to fit the semantic masks. In some embodiments, alternatively or additionally, semantic masks can be used in the loss function for training the NeRF model, as illustrated by the dashed arrow in FIG. 10. For example, some implementations can add other branches at the end of the loss function training and force them to generate the semantic mask as groundtruth.

Figure 11E:
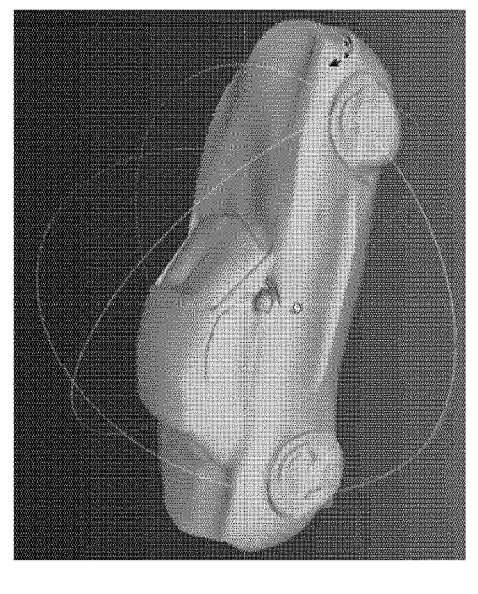
FIGS. 11A-11F illustrate an example in which performance improvements can be achieved using the enhanced NeRF pipeline according to some embodiments, as compared to the traditional NeRF pipeline.
Figure 11F:
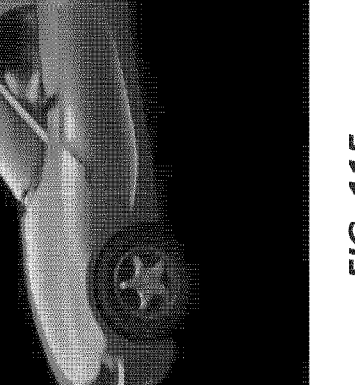
Figure 11B:
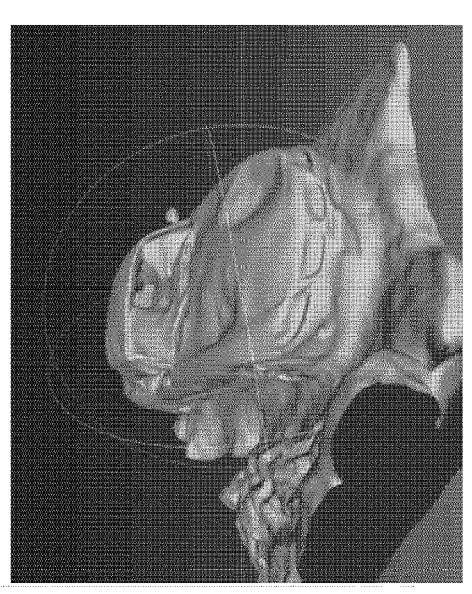
Figure 11D:
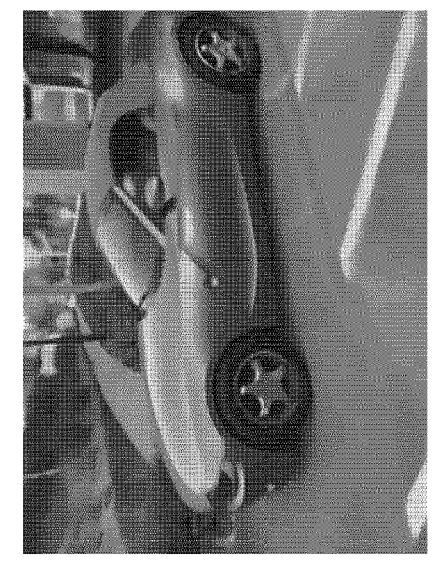
Figure 11D:
Figure 11A:
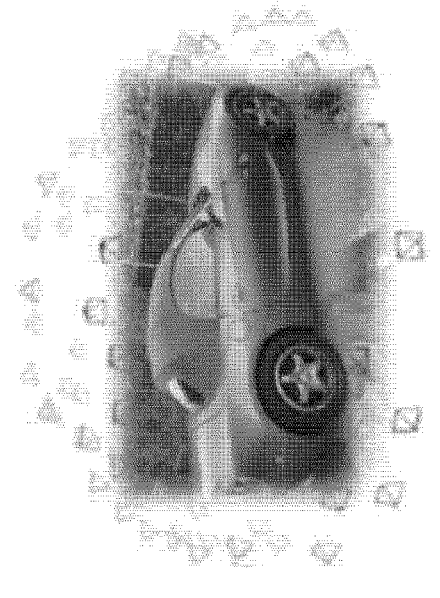
Figure 11A:
Figure 11C:
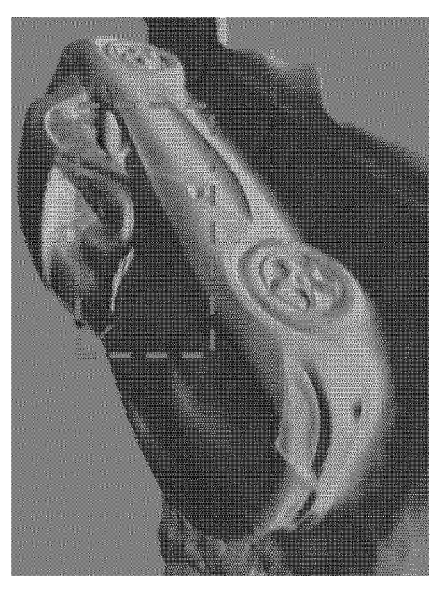

FIGS. 11A-11F illustrate an example in which performance improvements can be achieved using the enhanced NeRF pipeline with semantics priors, according to embodiments of the present disclosure, as compared to a traditional NeRF pipeline. FIG. 11A illustrates that a set of 2D images of a car is captured at various camera angles. FIG. 11B shows a 3D model of the car generated using a traditional NeRF pipeline. As illustrated, the 3D model is rather noisy. Besides the car, the 3D model also includes the ground. FIG. 11C shows a surface normal map of the 3D model shown in FIG. 11B. As illustrated in FIG. 11C, there are some artifacts in the glass and the metallic surface of the car (e.g., the glass appears to be broken in the area inside the red dashed box). FIG. 11D shows a rendering of the car from the 3D model generated using the traditional NeRF pipeline. FIG. 11E shows a 3D model of the car generated using the enhanced NeRF pipeline employing embedded semantic masks according to embodiments of the present disclosure. FIG. 11F shows a rendering of the car from the 3D model generated using the enhanced NeRF pipeline employing embedded semantic masks. As illustrated, the enhanced NeRF pipeline employing embedded semantic masks produces a better quality 3D model as compared to the traditional NeRF pipeline. The ground is removed from the 3D model, as the car is the main object of interest. According to some embodiments, different parts of the car can be segmented separately. For example, the wheels can be modeled separately.

Figure 12:
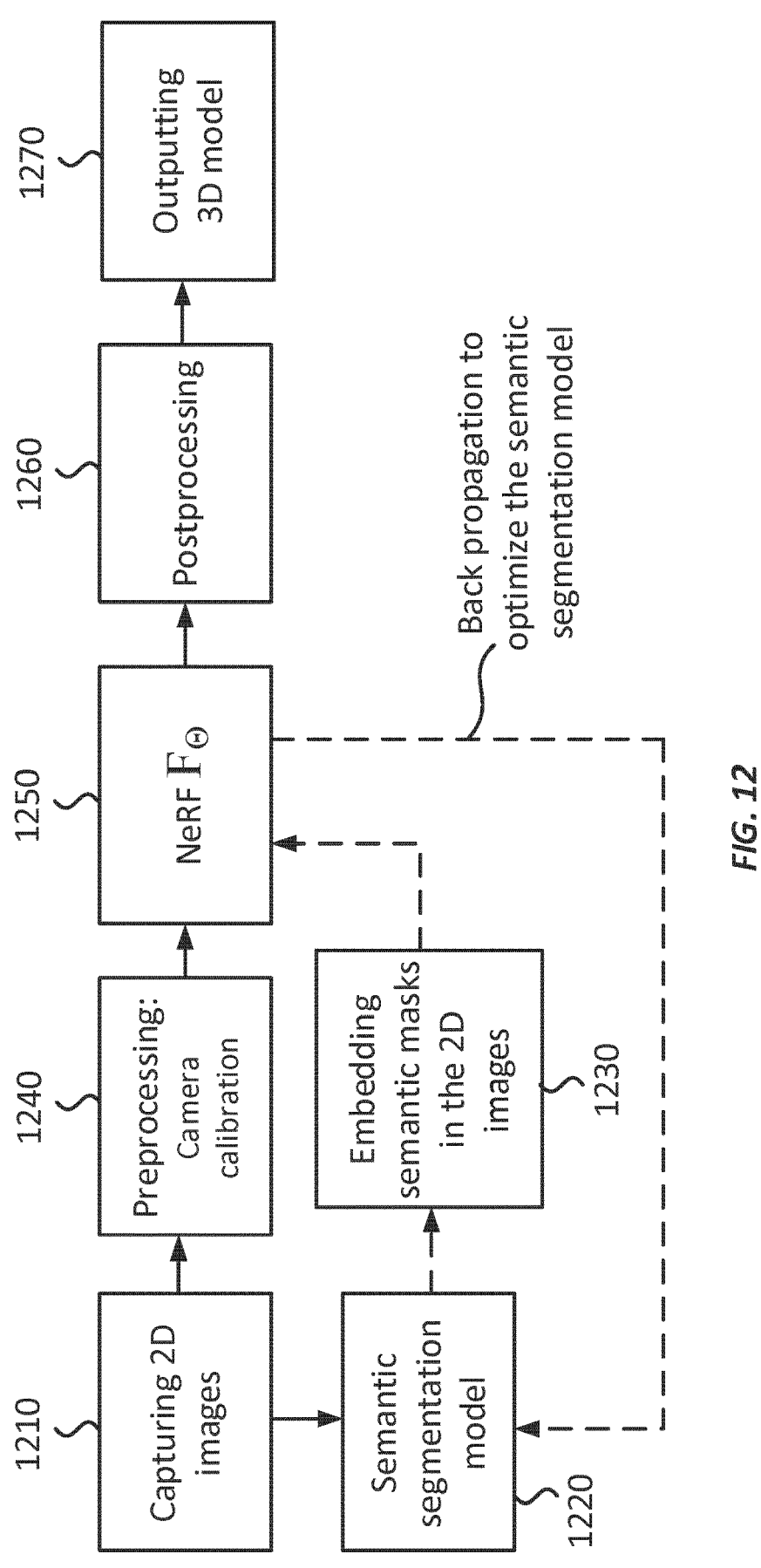
FIG. 12 illustrates an exemplary pipeline for training a NeRF model and a semantic segmentation model integrally together, according to some embodiments.

In some embodiments, a semantic segmentation model can be trained together with a NeRF model integrally. FIG. 12 illustrates an exemplary pipeline for training a NeRF model and a semantic segmentation model integrally together according to some embodiments. At 1210, a set of 2D images of a scene is captured. At 1220, semantic masks are generated from the set of 2D images by a semantic segmentation model (e.g., a neural network). At 1230, the semantic masks are embedded in the set of 2D images. At 1240, the set of 2D images are preprocessed to obtain intrinsic and extrinsic camera parameters, including the positions and directions of the cameras for all of the 2D images. At 1250, the set of 2D images with embedded semantic masks, as well as the intrinsic and extrinsic camera parameters, are used as a training dataset to train the NeRF model. The output of the NeRF model is back propagated to the semantic segmentation model 1220 to train the semantic segmentation model 1220. Thus, the semantic segmentation model 1220 and the NeRF model 1250 are trained together in a loop indicated by the dashed arrows. After the training is completed, the weights @ of the NeRF model $F_\Theta$ implicitly represent a 3D model of the scene. At the same time, the semantic masks are also optimized. At 1260, postprocessing can be performed to convert the implicit 3D model into a mesh (or some other form of explicit representation). At 1270, the 3D model (e.g., a mesh) is output.

Figures 13A, 13B, 13C:
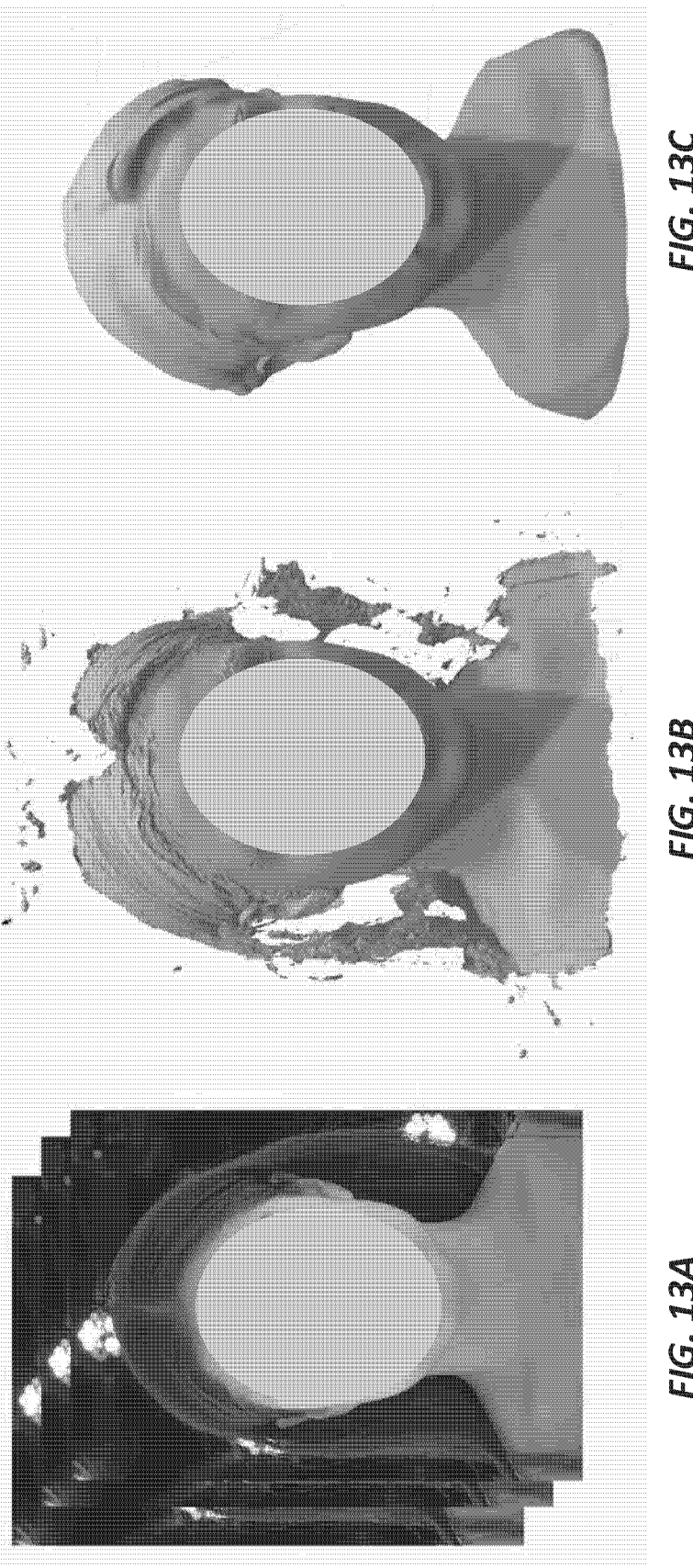
FIGS. 13A-13C and 14A-14C illustrate examples of generating 3D models including fuzzy regions, according to some embodiments.

According to some embodiments, the enhanced NeRF pipeline employing embedded semantic masks can also be applied to generate high quality 3D models of fuzzy regions, such as human hair. FIGS. 13A-13C illustrate an example with the face redacted for privacy reasons. FIG. 13A shows a set of 2D images of a head obtained from lightstage scan data. FIG. 13B shows a 3D model of the head (or bust) generated by traditional lightstage photogrammetry. FIG. 13C shows a 3D model of the head generated by the enhanced NeRF pipeline employing embedded semantic masks according to embodiments of the present disclosure. As illustrated, the 3D model shown in FIG. 13C has much better quality in the hair region than the 3D model shown in FIG. 13B.

Figure 14C:
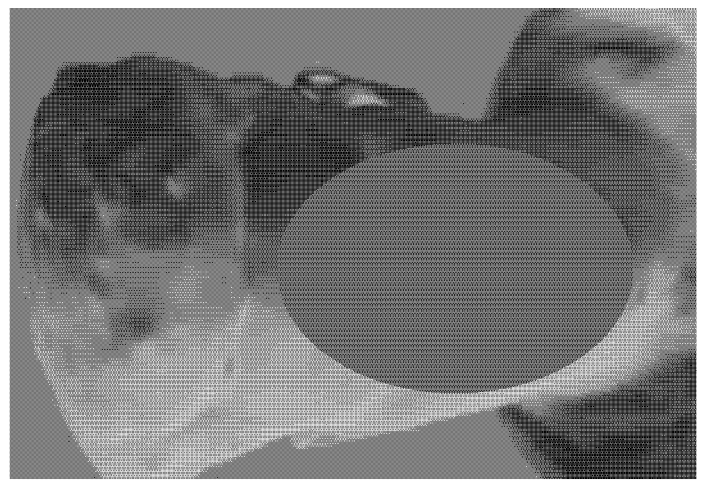
Figure 14B:
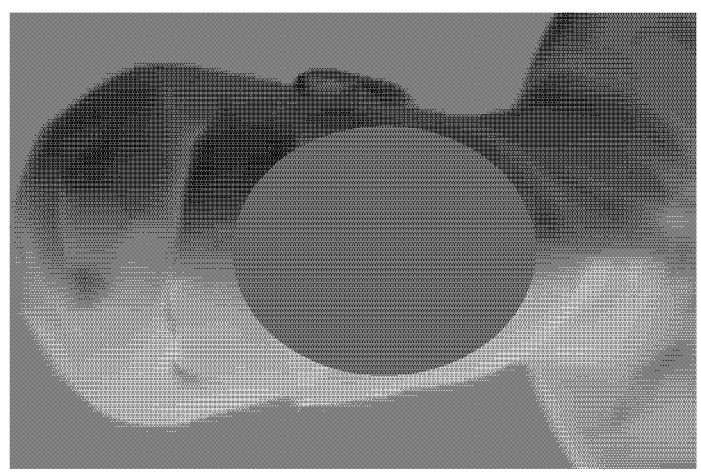
Figure 14A:
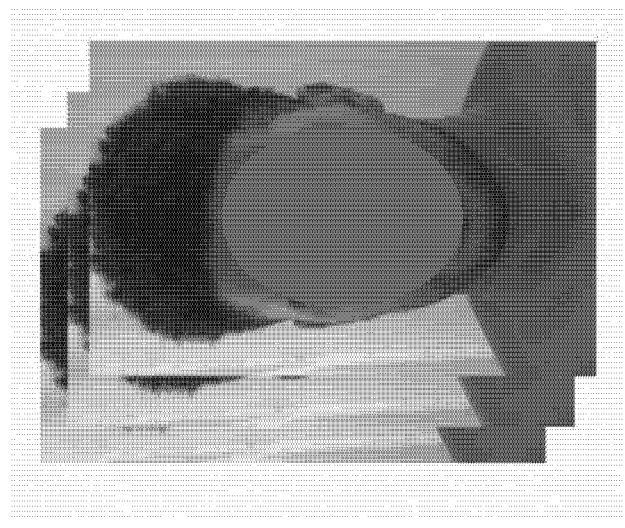

FIGS. 14A and 14B illustrate another example with the face redacted for privacy reasons. FIG. 14A shows a set of 2D images of a head obtained from lightstage scan data. FIG. 14B shows a 3D model of the head generated by a traditional NeRF pipeline. FIG. 14C shows a 3D model of the head generated by the enhanced NeRF pipeline employing embedded semantic masks according to embodiments of the present disclosure. As illustrated, the 3D model shown in FIG. 14C has a better quality (e.g., more realistic) in the hair region than the 3D model shown in FIG. 14B.

The enhanced NeRF pipeline employing embedded semantic masks can also be applied to generating 3D models from casual world captures. Multiple 2D images (e.g., 30-50 images) of a scene from various angles can be captured, e.g., by using a mobile phone camera. 3D models of the objects in the scene can be generated by the enhanced NeRF model trained on the 2D images with embedded semantic masks, according to embodiments of the present disclosure.

Figure 15:
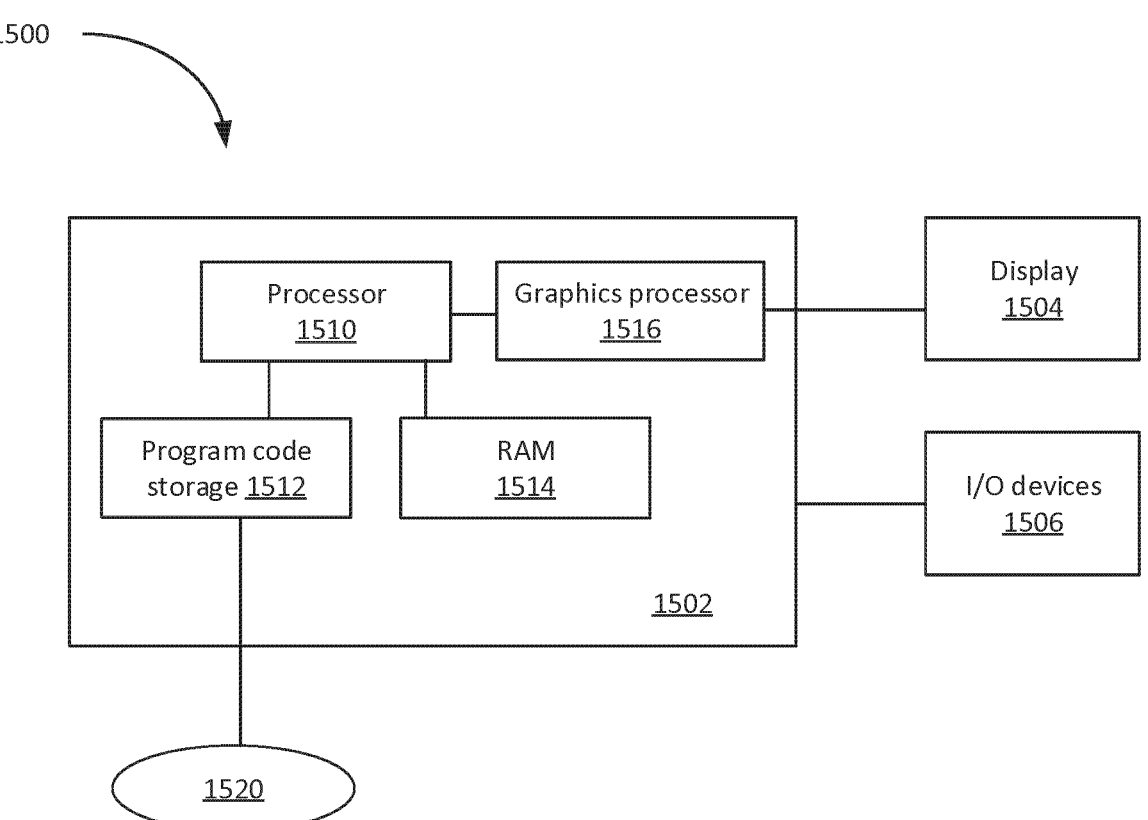
FIG. 15 is a block diagram of a computer system for generating 3D models according to aspects of the present disclosure.

FIG. 15 is a block diagram of a computer system 1500 for generating 3D models according to aspects of the present disclosure. The computer system 1500 is shown comprising a console 1502 coupled to a display 1504 and input/output (I/O) devices 1506. Console 1502 is shown including a processor 1510, program code storage 1512, temporary data storage 1514, and a graphics processor 1516. Console 1502 may be a general-purpose laptop or desktop computer, or other suitable computing system, such as a mobile phone or tablet computer. Although shown as one processor in FIG. 15, processor 1510 may include one or more processors having one or more processing cores. Similarly, although shown as one graphics processor in FIG. 15, graphics processor 1516 may include one or more graphics processors having one or more processing cores.

Program code storage 1512 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 1520 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

In one embodiment, I/O devices 1506 are devices a user interacts with console 1502. I/O devices 1506 may include any device for interacting with console 1502, including but not limited to joystick, keyboard, mouse, keypad, virtual reality (VR) or augmented reality (AR) headset or device, etc.

Display 1504 can be any type of display device, including a television, computer monitor, laptop screen, mobile device screen, tablet screen, etc. In some embodiments, I/O devices 1506 and display 1504 comprise a common device, e.g., a touchscreen device. Still further, in some embodiments, one or more of the I/O devices 1506 and display 1504 are integrated in the console 1502.

Various other components may be included in console 1502, but are omitted for clarity. An example includes a networking device configured to connect the console 1502 to a network, such as the Internet.

FIG. 16 is a flow diagram of method steps for generating a 3D model of one or more objects in a scene according to some embodiments. In various implementations, the method can be performed by the processor 1510, the graphics processor 1516, or a combination of the processor 1510 and the graphics processor 1516.

The method includes, at 1610, obtaining a set of 2D images of a scene acquired by one or more cameras from a plurality of camera angles at a plurality of camera positions. Each 2D image in the set of 2D images corresponds to a respective camera angle and a respective camera position. In some embodiments, the one or more cameras include a mobile phone camera or a video camera. In some embodiments, the scene includes a casual world scene or a light-stage scene.

The method further includes, at 1620, obtaining the respective camera angle and the respective camera position for each 2D image in the set of 2D images. In some embodiments, the respective camera angle and the respective camera position for each 2D image in the set of 2D images are obtained by preprocessing each 2D image in the set of 2D images using a Colmap algorithm.

The method further includes, at 1630, generating one or more semantic masks from the set of 2D images. Each semantic mask corresponds to a class of one or more objects in the scene. In some embodiments, the generating the one or more semantic masks is performed using a machine-learning model. In some embodiments, the machine-learning model includes a convolutional neural network.

The method further includes, at 1640, training a NeRF model, using the set of 2D images and the one or more semantic masks as a training dataset, to obtain a trained NeRF model. The trained NeRF model is an implicit 3D model of the one or more objects in the scene. In some embodiments, the method further includes postprocessing the implicit 3D model to generate a 3D mesh representing at least one of the one or more objects in the scene. In some embodiments, the postprocessing is performed using a Marching Cubes algorithm.

In some embodiments, the training of the NeRF model includes iteratively generating one or more predicted semantic masks, and minimizing a loss function relating to differences between the one or more predicted semantic masks and the one or more semantic masks. In some embodiments, in which the generating the one or more semantic masks is performed using a machine-learning model, the machine-learning model and the NeRF model are integrally trained together.

As described above, embodiments of this disclosure provide enhanced NeRF pipelines that employ semantic priors for generating 3D models. Semantic masks are generated from a set of 2D images of a scene, and are embedded in the set of 2D images. The set of 2D images with the embedded semantic masks is used as a training dataset to train a NeRF model. The enhanced NeRF pipelines are able to generate high quality 3D meshes automatically, without the need for manual clean-up. The enhanced NeRF pipeline can also generate high quality 3D models of fuzzy regions, such as human hair, for which traditional photogrammetry pipelines do not perform well. In some embodiments, alternatively or additionally, semantic masks can be used in the loss function for training the NeRF model. In some embodiments, a semantic segmentation model can be trained together with the NeRF model integrally.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method of generating a three-dimensional (3D) model, the method comprising:
   obtaining a set of two-dimensional (2D) images of a scene acquired by one or more cameras from a plurality of camera angles at a plurality of camera positions, wherein each 2D image in the set of 2D images corresponds to a respective camera angle and a respective camera position;
   obtaining the respective camera angle and the respective camera position for each 2D image in the set of 2D images;
   generating one or more semantic masks from the set of 2D images, wherein each semantic mask corresponds to a class of one or more objects in the scene and includes a respective group of associated voxels; and
   training a neural radiance field (NeRF) model, using the set of 2D images, and the one or more semantic masks as a training dataset, to obtain a trained NeRF model, the trained NeRF model being an implicit 3D model of the one or more objects in the scene, wherein the training the NeRF model guides the trained NeRF model to fit to the one or more semantic masks.

2. The method of claim 1, further comprising postprocessing the implicit 3D model to generate a 3D mesh representing at least one of the one or more objects in the scene.

3. The method of claim 2, wherein the postprocessing is performed using a Marching Cubes algorithm.

4. The method of claim 1, wherein the training of the NeRF model comprises:
   iteratively generating one or more predicted semantic masks;
   wherein the NeRF model is trained by minimizing a loss function that relates to differences between the one or more predicted semantic masks and the one or more semantic masks.

5. The method of claim 1, wherein the generating the one or more semantic masks is performed using a machine-learning model.

6. The method of claim 5, wherein the machine-learning model comprises a convolutional neural network.

7. The method of claim 5, wherein the machine-learning model and the NeRF model are integrally trained together.

8. The method of claim 1, wherein the obtaining the respective camera angle and the respective camera position for each 2D image in the set of 2D images comprises:
   preprocessing each 2D image in the set of 2D images using a Colmap algorithm to obtain the respective camera angle and the respective camera position for the 2D image.

9. The method of claim 1, wherein the one or more cameras comprise a mobile phone camera or a video camera.

10. The method of claim 1, wherein the scene comprises a casual world scene or a lightstage scene.

11. A non-transitory computer-readable storage medium storing instructions that, when executed by one or more processors, cause a computing device to generate a three-dimensional (3D) model, by performing the steps of:
   obtaining a set of two-dimensional (2D) images of a scene acquired by one or more cameras from a plurality of camera angles at a plurality of camera positions, wherein each 2D image in the set of 2D images corresponds to a respective camera angle and a respective camera position;
   obtaining the respective camera angle and the respective camera position for each 2D image in the set of 2D images;
   generating one or more semantic masks from the set of 2D images, wherein each semantic mask corresponds to a class of one or more objects in the scene and includes a respective group of associated voxels; and
   training a neural radiance field (NeRF) model, using the set of 2D images and the one or more semantic masks as a training dataset, to obtain a trained NeRF model, the trained NeRF model being an implicit 3D model of the one or more objects in the scene, wherein the training the NeRF model guides the trained NeRF model to fit to the one or more semantic masks.

12. The non-transitory computer-readable storage medium of claim 11, wherein the instructions, when executed by the one or more processors, further cause the computing device to perform the step of:
   postprocessing the implicit 3D model to generate a 3D mesh representing at least one of the one or more objects in the scene.

13. The non-transitory computer-readable storage medium of claim 11, wherein the training of the NeRF model comprises:
   iteratively generating one or more predicted semantic masks;
   wherein the NeRF model is trained by minimizing a loss function that relates to differences between the one or more predicted semantic masks and the one or more semantic masks.

14. The non-transitory computer-readable storage medium of claim 11, wherein the generating the one or more semantic masks is performed using a machine-learning model.

15. The non-transitory computer-readable storage medium of claim 14, wherein the machine-learning model comprises a convolutional neural network.

16. The non-transitory computer-readable storage medium of claim 14, wherein the machine-learning model and the NeRF model are integrally trained together.

17. A device for generating a three-dimensional (3D) model, the device comprising:
   a memory storing instructions; and
   one or more processors configured to execute the instructions to cause the device to:
      obtain a set of two-dimensional (2D) images of a scene acquired by one or more cameras from a plurality of camera angles at a plurality of camera positions, wherein each 2D image in the set of 2D images corresponds to a respective camera angle and a respective camera position;
      obtain the respective camera angle and the respective camera position for each 2D image in the set of 2D images;
      generate one or more semantic masks from the set of 2D images, wherein each semantic mask corresponds to a class of one or more objects in the scene and includes a respective group of associated voxels; and train a neural radiance field (NeRF) model, using the set of 2D images and the one or more semantic masks as a training dataset, to obtain a trained NeRF model, the trained NeRF model being an implicit 3D model of the one or more objects in the scene, wherein the training the NeRF model guides the trained NeRF model to fit to the one or more semantic masks.

18. The device of claim 17, wherein the instructions, when executed by the one or more processors, further cause the device to:

postprocess the implicit 3D model to generate a 3D mesh representing at least one of the one or more objects in the scene.

19. The device of claim 17, wherein the training of the NeRF model comprises:

iteratively generating one or more predicted semantic masks;

wherein the NeRF model is trained by minimizing a loss function that relates to differences between the one or more predicted semantic masks and the one or more semantic masks.

20. The device of claim 17, wherein the generating the one or more semantic masks is performed using a machine-learning model, and wherein the machine-learning model and the NeRF model are integrally trained together.

* * * * *